United States Patent
Norton et al.

(10) Patent No.: US 10,585,411 B2
(45) Date of Patent: Mar. 10, 2020

(54) VEHICLE POWER SUPPLY CONTROL USING SERIAL COMMUNICATION

(71) Applicant: Ford Global Technologies, LLC, Dearborn, MI (US)

(72) Inventors: Alan Peter Norton, West Bloomfield, MI (US); Ronald Eric Zlotnik, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 15/889,894

(22) Filed: Feb. 6, 2018

(65) Prior Publication Data

US 2019/0243322 A1   Aug. 8, 2019

(51) Int. Cl.
G05B 19/042   (2006.01)

(52) U.S. Cl.
CPC .... G05B 19/042 (2013.01); *G05B 2219/2231* (2013.01); *G05B 2219/2637* (2013.01)

(58) Field of Classification Search
CPC .......... G05B 19/042; G05B 2219/2637; G05B 2219/2231
See application file for complete search history.

(56) References Cited

U.S. PATENT DOCUMENTS

| | | | | |
|---|---|---|---|---|
| 3,815,014 A * | 6/1974 | Davis | ...................... | G05F 1/577 323/267 |
| 5,467,281 A * | 11/1995 | Iwashita | ................ | B62D 5/065 180/422 |
| 5,990,459 A * | 11/1999 | Feustel | ................ | B60H 1/2218 219/202 |
| 6,056,410 A * | 5/2000 | Hoekstra | ................. | B60R 1/088 359/267 |
| 6,356,471 B1 * | 3/2002 | Fang | ....................... | H02J 9/062 307/72 |
| 6,744,820 B1 * | 6/2004 | Khairallah | .............. | B60R 21/01 340/438 |
| 7,519,753 B2 * | 4/2009 | Misawa | ................ | H04L 12/403 710/110 |
| 8,120,321 B2 * | 2/2012 | Vezzini | ................. | H02J 7/0014 320/118 |
| 8,324,834 B2 * | 12/2012 | Wang | ................. | H05B 33/0827 315/291 |
| 8,504,748 B2 | 8/2013 | Matsuo et al. | | |

(Continued)

FOREIGN PATENT DOCUMENTS

DE    10152216 A1    5/2003
JP    H 07212843 A *   8/1995

(Continued)

*Primary Examiner* — Pinping Sun
(74) *Attorney, Agent, or Firm* — Frank Lollo; Eversheds Sutherland (US) LLP (57) ABSTRACT

Method and apparatus are disclosed for controlling a vehicle power supply using serial communication. An example vehicle power system includes a host controller configured to supply a slave controller with a first voltage. The vehicle power system also includes the slave controller. The slave controller is configured to determine a received voltage, determine a difference between the received voltage and a nominal operating voltage, and transmit the difference to the host controller. The host controller is then configured to modify the first voltage based on the difference.

10 Claims, 4 Drawing Sheets

(56) References Cited

U.S. PATENT DOCUMENTS

| | | | |
|---|---|---|---|
| 8,773,086 B1 * | 7/2014 | Kozhumam | H03K 17/56 |
| | | | 323/266 |
| 9,160,414 B2 | 10/2015 | Lekatsas et al. | |
| 2007/0013309 A1 * | 1/2007 | Han | G09G 3/2932 |
| | | | 313/584 |
| 2007/0210771 A1 * | 9/2007 | Wilson | H03F 1/0211 |
| | | | 323/278 |
| 2009/0128045 A1 * | 5/2009 | Szczeszynski | H05B 33/0815 |
| | | | 315/185 R |
| 2012/0293129 A1 * | 11/2012 | Naghshtabrizi | H02J 7/0016 |
| | | | 320/118 |
| 2013/0290748 A1 * | 10/2013 | Zhu | G06F 1/26 |
| | | | 713/300 |
| 2014/0077598 A1 * | 3/2014 | Priel | G05F 1/56 |
| | | | 307/31 |
| 2014/0091732 A1 * | 4/2014 | Lekatsas | H04B 3/548 |
| | | | 315/307 |
| 2014/0320093 A1 * | 10/2014 | Zhao | H02M 3/156 |
| | | | 323/234 |
| 2015/0378411 A1 * | 12/2015 | Grenat | G01R 19/0084 |
| | | | 713/340 |
| 2018/0043463 A1 * | 2/2018 | Prieto | B21D 26/14 |
| 2019/0066594 A1 * | 2/2019 | Lee | G09G 3/3258 |

FOREIGN PATENT DOCUMENTS

| | | | |
|---|---|---|---|
| KR | 20130053885 A | 5/2013 | |
| WO | WO-2007102031 A1 * | 9/2007 | H01M 8/04276 |
| WO | WO 2007102031 A1 | 9/2007 | |
| WO | WO-2017197567 A1 * | 11/2017 | H02J 9/00 |

* cited by examiner

VEHICLE POWER SUPPLY CONTROL USING SERIAL COMMUNICATION

TECHNICAL FIELD

The present disclosure generally relates to vehicle electronics and, more specifically, systems and methods for controlling a vehicle power system using serial communication.

BACKGROUND

Many vehicles include electrical systems that make use of battery and/or alternator power to operate. These vehicles may be set up such that a host controller provides power to one or more slave controllers, or peripheral control modules. The peripheral control modules may be located at various places within the vehicle, nearby the electrical system that they are designed to control. Further, the host controller may provide voltage to the peripheral control modules to enable them to operate.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for control of a vehicle power system including a host controller and one or more slave or peripheral controllers. An example disclosed vehicle power system includes a host controller configured to supply a slave controller with a first voltage, and the slave controller. The slave controller is configured to determine a received supply voltage, determine a difference between the received voltage and a nominal operating voltage, and transmit the difference to the host controller. The host controller is then further configured to modify the first voltage based on the difference.

An example disclosed method includes supplying, by a host controller of a vehicle, a slave controller with a first voltage. The method also includes determining, by the slave controller, a received supply voltage. The method further includes determining a difference between the received voltage and a nominal operating voltage of the slave controller. The method yet further includes transmitting the difference to the host controller. And the method still further includes modifying the first voltage based on the difference.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, many vehicles may include power systems having a host controller and one or more slave controllers. The host controller and/or slave controllers may be referred to herein as "controllers," "modules," or "control modules." Further, the slave controller(s) may be referred to as "peripheral" controllers or modules. In some vehicles, the peripheral modules may be located remotely from the host controller, and as such may have a significant amount of wiring between the host and the peripheral, in order to supply voltage and current to the peripheral module. As the current and voltage pass from the host to the peripheral, there may be considerable losses due to the inherent resistance of the wires, the relative differences in the ground between the host and the peripheral, and due to other losses in the system. Further, the losses may change over time both in the short term and long term. Short term changes may be due to various electrical devices being added to or removed from the system (e.g., powering on and off). Long term changes may be due to general wear and tear on the wiring and other electrical systems, and general deterioration over time.

In order to compensate for these losses, some power systems may be set up to operate under a worst-case scenario. The worst case scenario operation of a host controller may include providing a higher than needed voltage to the peripheral, in order to compensate for any losses in the system and for the degradation over time noted above. But where the peripheral receives a higher than needed voltage, the peripheral may include a voltage regulator configured to reduce the voltage to a nominal operating level, thereby wasting energy as heat and causing wear and tear on the peripheral components. Further, in addition to the added wear and tear, the need for additional regulation circuitry to compensate for the higher voltage due to system losses can result in high costs for over design of the peripheral and host, added points of failure, and potentially reduced reliability of the system.

With these issues in mind, example embodiments of the present disclosure may include a host controller providing power to one or more peripheral or slave controllers. The slave controller may determine the received voltage, or the voltage experienced by the slave controller. The received voltage may be different than the voltage supplied by the host controller due to losses in the system, differences in ground levels between the host and slave, and for various other reasons. The slave controller may then compare the received voltage to a nominal operating voltage of the slave, and determine an over voltage or under voltage amount. This amount may then be communicated to the host controller using a serial communication standard. The host controller may then modify the voltage provided to the slave controller, so that the over or under voltage is reduced and less regulation of the voltage is required by the slave controller. This can allow for less complex and/or smaller regulation circuitry in the slave controller, less power dissipation, less heat generated, and less wear and tear on the system components.

Figure 1:
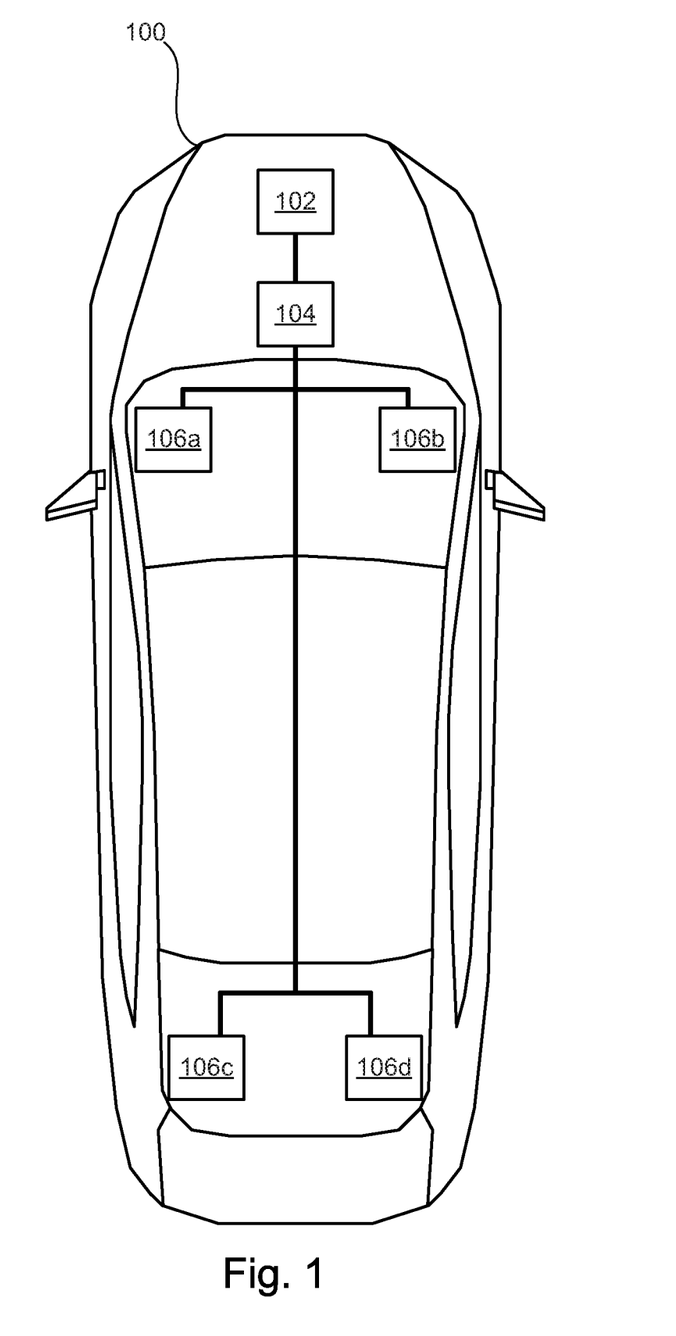
FIG. 1 illustrates an example vehicle having a vehicle power system according to embodiments of the present disclosure.

FIG. 1 illustrates an example vehicle 100 that may include the power systems described herein, and may be configured to carry out the methods described herein. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIGS. 2 and 3).

As shown in FIG. 1, vehicle 100 may include a battery 102, a host controller 104, and a plurality of slave controllers 106a-d. The battery 102 may be a low voltage vehicle battery or a high voltage battery used for vehicle traction. Battery 102 may supply power to various vehicle systems, including lights, sensors, safety systems, controllers, and more.

Figure 2:
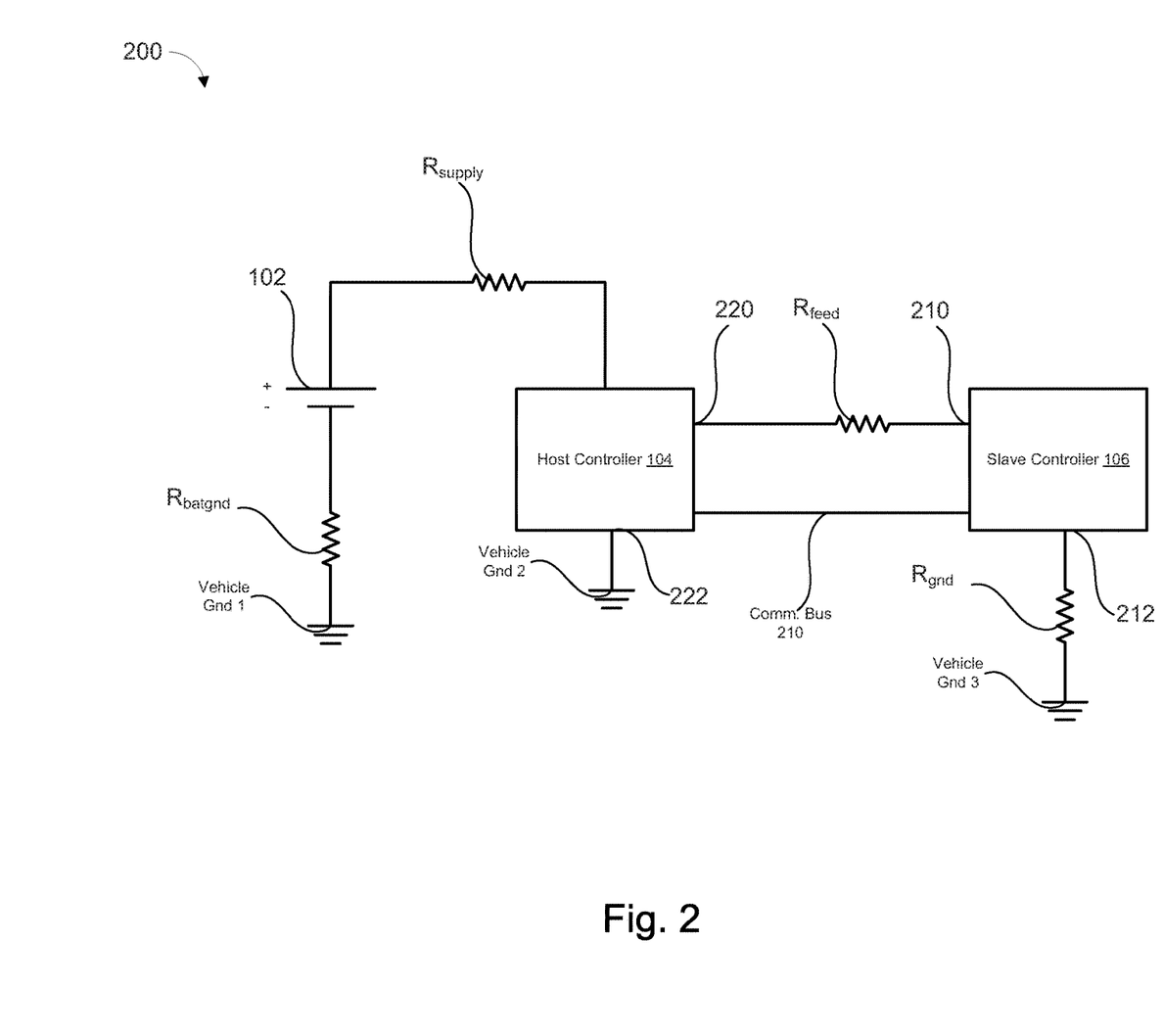
FIG. 2 illustrates a simplified circuit diagram of electronic components of the vehicle power system of FIG. 1.
Figure 3:
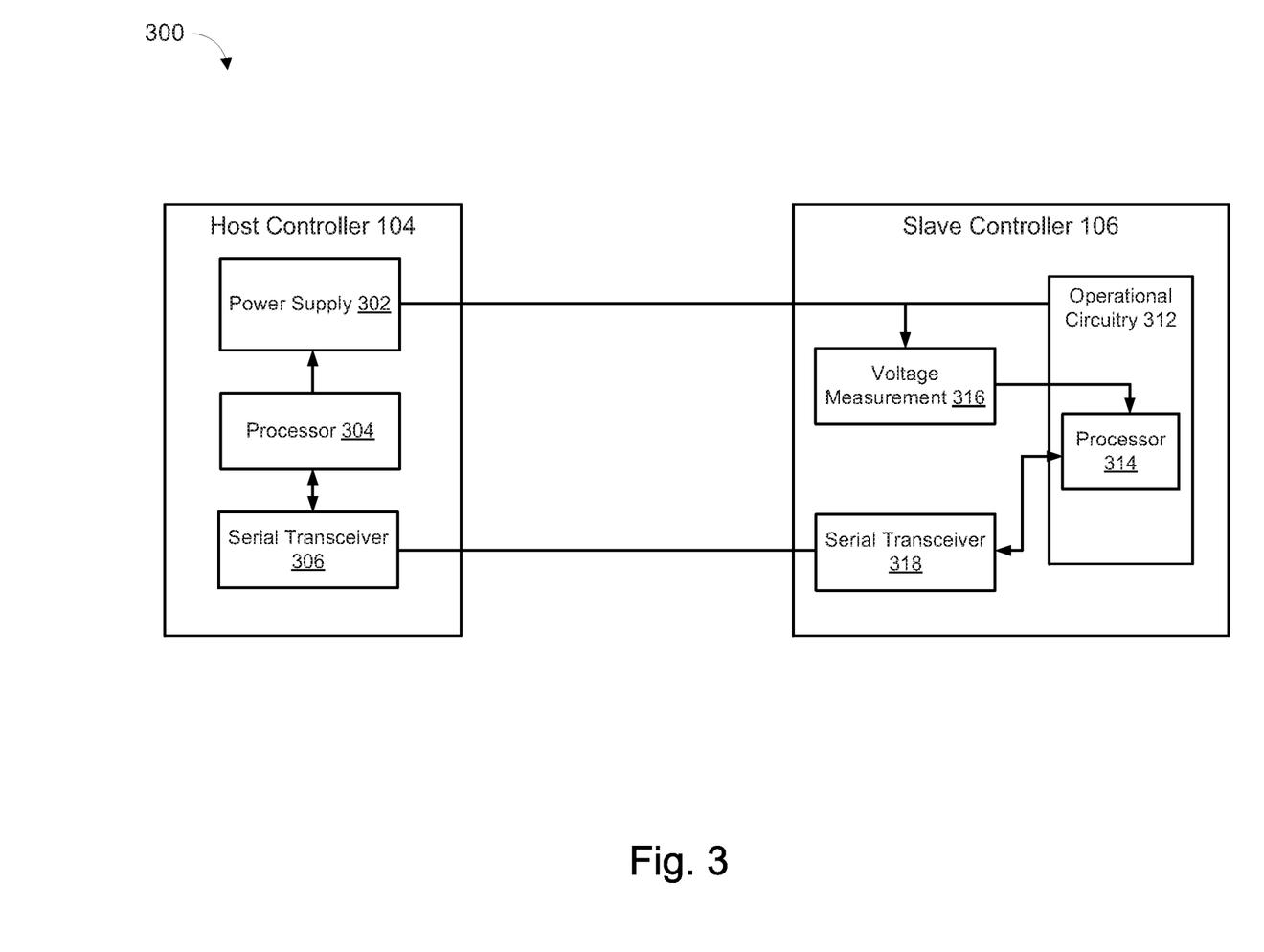
FIG. 3 illustrates a simplified block diagram of the vehicle power system according to embodiments of the present disclosure.

The host controller 104 is described in more detail with respect to FIGS. 2 and 3. Host controller 104 may include circuitry configured to provide a first voltage to the slave controller(s) 106a-d. The host controller may provide the slave controller(s) with a switched power supply, thus enabling the host controller to vary the voltage supplied to the slave controller(s). It should be noted that vehicle 100 may include a single host controller 104, or may include a plurality of host controllers, each having one or more slave or peripheral controllers. The host controller 104 may be positioned near a processing unit of the vehicle, such as a central computing system used to control various aspects of the vehicle (controls, displays, entertainment systems, etc.).

The slave controllers 106a-d may be configured to control one or more vehicle systems or devices that are positioned throughout vehicle 100. Although embodiments may be described herein referring to specific features of the slave controllers, it should be noted that slave controller(s) 106a-d may be sensors, actuators, and/or remote radio receiving devices. Each slave controller may include circuitry and many be configured to provide power to various electrical components of the vehicle. Slave controllers 106a-d may also include a processor, logic, or other circuitry configured to make one or more determinations regarding whether and how to power one or more electrical components, as well as to monitor various aspects of the electrical components and/or slave controller itself such as the current, voltage, temperature, state, duration of operation, etc.

FIG. 2 illustrates an example diagram 200 showing electronic components of a vehicle power system of the present disclosure. Diagram 200 includes a battery 102, a host controller, 104, a slave controller 106, and various electrical resistances and grounds of the system.

The diagram of FIG. 2 illustrates that there may be voltage drops in the system due to the electrical resistance of the vehicle wiring, which may depend upon the distance between the host controller and the battery, between the host controller and the slave controller, and between the battery and the slave controller. Further, the voltage at one or more points may depend upon the relative ground at that point. For instance, the vehicle grounds (vehicle gnd 1, vehicle gnd 2, and vehicle gnd 3) may be at different offset values with respect to each other based on the characteristics of one or more other parts of the system. As an example, the ground values may change when loads are added to or removed from the system, such as exterior lighting and heated windshield elements.

The voltage between points 210 and 212 in FIG. 2 may be the voltage "seen" by the slave controller 106. This is the supply voltage that the slave controller 106 receives, and it is affected by the various electrical resistances and ground levels. Within FIG. 2, the received voltage may be identified as:

$$V_{Received}=V_{Battery}-(V_{Rsupply}+V_{Rfeed}+V_{Rgnd})-(V_{Gnd1}-V_{Gnd3})$$

The voltage provided by the battery 102 and seen by the host controller 104 may be reduced due to the resistance of the supply wiring ($V_{Rsupply}$). And the voltage provided or supplied by the host controller 104, (i.e., the voltage between points 220 and 222) may be reduced by the resistance of the feed wiring and ground wiring ($V_{Rfeed}$ and $V_{Rgnd}$). As such, the voltage seen by the slave controller 106 (the voltage between points 210 and 212) may be less than the voltage provided by the battery 102 and/or the host controller 104 by several volts. If a worst case scenario (i.e., a high voltage drop due to resistances of the system) is considered and built into the system operation, there may be a higher than needed voltage seen by the slave controller 106. As such, the slave controller 106 may include a regulator to reduce the high received supply voltage to a nominal operating voltage.

In some embodiments, the host controller 104 may be configured to supply a first voltage to the slave controller 106. The first voltage may be less than a voltage provided by the battery 102. In some cases, the first voltage supplied by the host controller 104 may be the voltage between points 220 and 222 in FIG. 2, and may be a relatively high voltage compared to the expected voltage needed for operation of the slave controller. For example, if the slave controller nominal operating voltage is nine (9) volts, the host controller may initially supply a first voltage of eleven (11) volts. The initial supply of a higher than needed voltage may be a safety factor such that any losses due to the wiring resistance do not drop the received voltage by the slave controller down to below the nominal operating voltage.

In some examples, the first voltage may be the maximum output voltage of the host controller. The maximum may be output initially to avoid providing too low a voltage, as described above. Alternatively, in some examples the first voltage may be less than a maximum output voltage of the host controller 104. This may be the case where the resistances and/or voltage drop between the host controller 104 and the slave controller 106 are known or can be estimated. The host controller may then provide less than its maximum output based on a history of voltages provided to the slave controller, or based on one or more other measurements or sensor values. For example, if the vehicle is cycled off and on, and the methods and systems described herein operated for a previous ignition cycle, the values of the voltages may be retained or stored. When the vehicle is cycled on again, the saved values may be used.

The slave module 106 may be configured to determine the received voltage of the slave controller. This may be the voltage between points 210 and 212 in FIG. 2. This received voltage may be different from the supplied first voltage, due to the wiring and other resistances in the system. In some examples, the slave controller 106 may include analog circuitry or logic that can determine the received voltage.

The circuitry of the slave controller 106 may be configured to determine the received voltage and compare the received voltage to a nominal operating voltage of the slave controller 106. The nominal operating voltage may be a designed operating voltage of the slave controller, which may be less than 12V.

The slave controller 106 may be configured to determine the difference between the received voltage and the nominal operating voltage. In some examples, the difference may be a positive value, regardless of whether the received voltage is greater than or less than the nominal operating voltage. Alternatively, the difference may be a signed value (e.g., positive or negative), which may correspond to whether the received voltage is greater or less than the nominal operating voltage.

In some examples, the nominal operating voltage may be used as a benchmark. If the nominal operating voltage is nine (9) volts, a received voltage of eleven (11) volts results in a difference of two or positive 2 (2 or +2) volts. However where the nominal operating voltage is nine (9) volts and the received voltage is six (6) volts, the resulting difference is three or negative three (3 or −3) volts. Either or both of the absolute difference and the signed difference may be determined.

After the difference is determined by the slave controller 106, the difference may be transmitted to the host controller 104. The slave controller 106 and the host controller 104 may be communicatively coupled via a serial communication protocol, such as a CAN network, A2B, Ethernet, or another type of communication network used in a vehicle.

In some examples, the vehicle may make use of a vehicle data bus which may include one or more data buses that communicatively couple various electrical systems and components. In some examples, the vehicle data bus may be implemented in accordance with the controller area network (CAN) bus protocol as defined by International Standards Organization (ISO) 11898-1. Alternatively, in some examples, the vehicle data bus may be a Media Oriented Systems Transport (MOST) bus, or a CAN flexible data (CAN-FD) bus (ISO 11898-7).

Once the difference between the received voltage and the nominal operating voltage is received, the host controller may be configured to modify the first voltage (i.e., the supply voltage) provided to the slave controller based on the received difference. For example, where the received voltage is greater than the nominal operating voltage by a first amount (or the difference is positive), the host controller 104 may be configured to reduce the first voltage by the first amount. In other words, where the received voltage is eleven (11) volts and the nominal operating voltage is nine (9) volts, the difference may be the first amount of two (2) or plus two (+2) volts. The host controller may then reduce the first or supply voltage by the first amount, to nine (9) volts.

Alternatively, where the received voltage is less than the nominal operating voltage by a second amount, or where the difference is a negative value, the host controller may be configured to increase the first voltage by the second amount. As such, when the difference indicates that received voltage is below the nominal operating voltage, the host controller 104 may increase the voltage by a corresponding amount. And where the difference indicates that the received voltage is above the nominal operating voltage, the host controller 104 may decrease the voltage by a corresponding amount.

In some examples, there may be a buffer or safety factor added in, to prevent the first voltage or supply voltage from being dropped too low. For instance, where the difference is two (2) volts, the host controller may be configured to reduce the first voltage by less than two (2) volts. This may still provided a benefit to the system by requiring less reduction of the received voltage by the slave controller regulator, while at the same time maintaining a safety factor in the received voltage in the event the voltage fluctuates. Similarly, where the received voltage is less than the nominal operating voltage by two (2) volts, the host controller 104 may increase the first voltage by greater than two (2) volts, to include the safety factor. The host controller 104 may thus provide a supply voltage of slightly more than the nominal operating voltage required by the slave controller 106.

In some examples, there may be a plurality of slave controllers that are powered by a single host controller. In this case, each slave controller may determine a respective received voltage. Each slave controller may then compare the respective received voltage to a respective nominal operating voltage, to determine a respective difference. The plurality of differences corresponding to the plurality of slave controllers may then all be transmitted to the host controller, via serial communication protocol. The host controller may then determine whether to increase, decrease, or keep the supplied voltage constant based on the plurality of differences.

In some examples having a plurality of slave controllers, the host controller may determine the lowest respective difference. Where all the slave controllers are supplied by the same host controller, the host controller may be supplying the same output voltage to each slave controller. However due to differences in the slave controller positions, electronics, wiring, and other factors, the received voltage at each slave controller may be different. The host controller may determine the lowest possible output voltage it can supply while maintaining all the slave controllers at or above their respective nominal operating voltages. As such, where a first slave controller has a difference of plus one (+1) volts and a second slave controller has a difference of plus two (+2) volts, the host controller may decrease the supplied voltage by the lowest difference, i.e. by one (1) volt. Similarly, where the first slave controller has a difference of negative one (−1) volts, and the second slave controller has a difference of plus one (+2) volts, the host controller may decrease the supplied voltage by negative one (−1) volts which corresponds to an increase of one (1) volts. The host controller may thus be configured to determine the slave controller having the lowest received voltage, and responsively modify the supplied voltage in order to bring the lowest received voltage up to the nominal operating voltage required by the corresponding slave controller.

FIG. 3 illustrates a simplified block diagram of the connections between the host controller 104 and the slave controller 106 described herein. The host controller 104 may include a power supply 302, a processor 304, and a serial transceiver 306. The slave controller 106 may include operational circuitry 312, a processor 314, a voltage measurement circuit 316, and a serial transceiver 318.

The host controller power supply 302 may be configured to modify the output voltage supplied to the slave controller 106. This may be done based on control by the processor 304. The power supply 302 may supply a first voltage to the slave controller 106, which may be measured by the voltage measurement circuit 316 of the slave controller 106. The received voltage determined by the voltage measurement circuit 316 may be compared to a nominal operating voltage by the processor 314. The processor 314 may then determine a difference that should be transmitted to the host controller 104. The difference may be supplied to the serial transceiver 316 for transmission to the serial transceiver 306 of the host controller 104.

The host controller 104 may then receive the difference at the serial transceiver 306, and processor 304 may analyze the difference to determine what action to take with respect to the output or supply voltage. The processor may determine whether to increase or decrease the voltage, and by what amount. The power supply may then change based on control by the processor 304, in order to reduce or increase the supplied voltage.

The process described above of determining a received voltage, difference, and modifying the supplied voltage in response may be performed iteratively until a sufficient threshold is met. As the received voltage changes due to modifications by the host controller, it may become closer and closer to the nominal operating voltage. When the received voltage is within a threshold amount of the nominal operating voltage (e.g., 0.2 volts, 0.5 volts, or another amount), the host controller may maintain the output voltage even where there is a difference.

Further, in some examples, the received voltage may change over time as electrical systems are added to or removed from the system, thereby affecting the relative ground values. The slave controller may continuously monitor the received voltage, and may report the difference back to the host controller at regular intervals. This may allow the host controller to make modifications to the supplied voltage as things change within the system.

While the examples disclosed herein may describe various functions or actions as being performed by one or more components, it should be noted that the same functions or actions may be performed by one or more other components as well. For example, some embodiments disclosed herein may include the slave controller determining a received voltage, comparing the received voltage to a nominal operating voltage, and transmitting the difference to the host controller. Some embodiments may include the slave controller determining a received voltage, and transmitting the received voltage to the host controller, where the host controller is then configured to compare the received voltage to a nominal operating voltage of the slave controller. As such, in some embodiments, the host controller may be configured to perform one or more determinations or functions that are otherwise described with respect to the slave controller.

Processors 304 and 314 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). Each processor may also include or be coupled to a memory, which may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The memory may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory, the computer readable medium, and/or within the processor during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Example of Host Controller Performing Analysis

Figure 4:
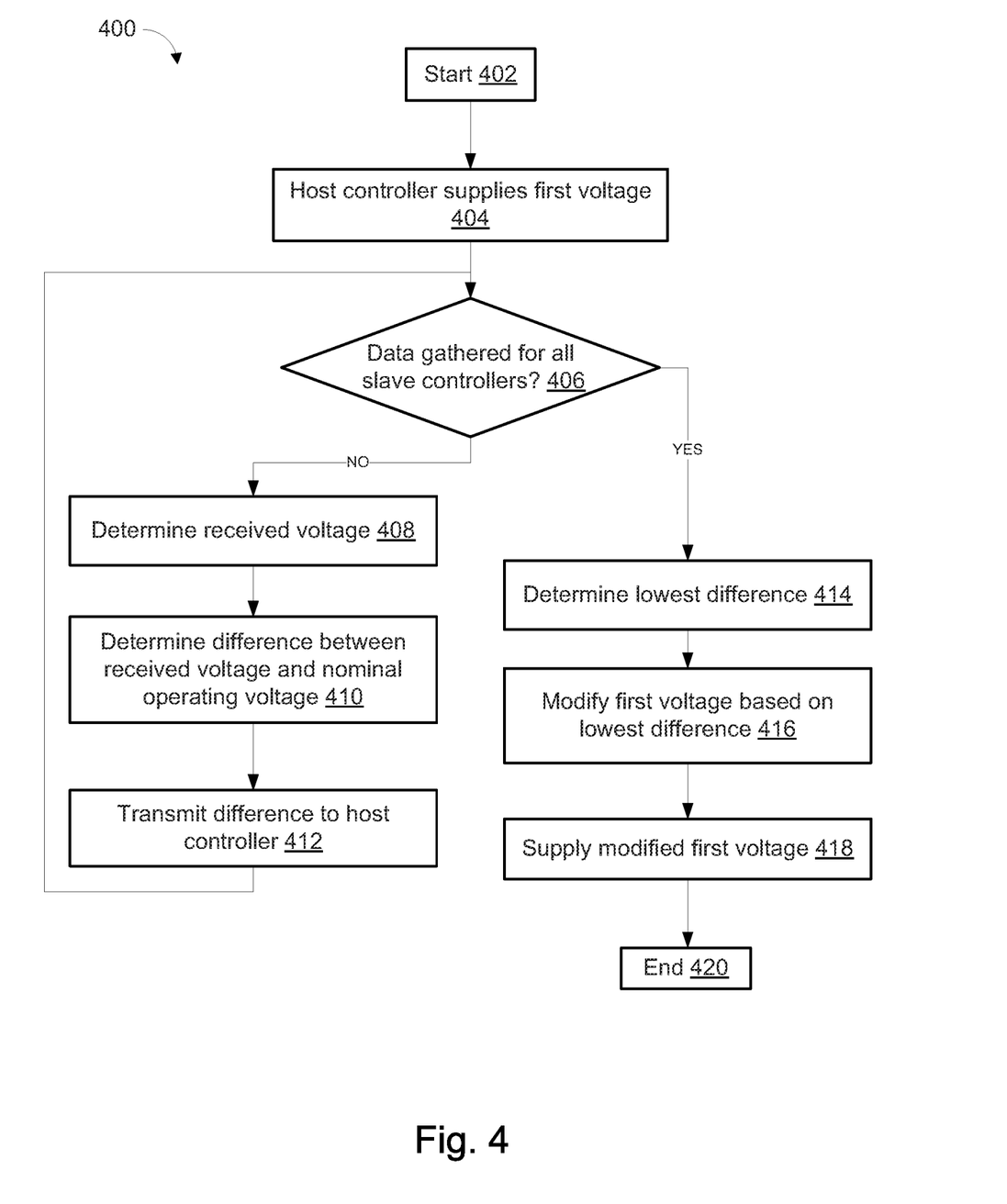
FIG. 4 illustrates a flowchart of an example method according to embodiments of the present disclosure.

FIG. 4 illustrates a flowchart of an example method 400 according to embodiments of the present disclosure. Method 400 may enable a vehicle power system to provide voltage from a host controller to a slave controller with minimal regulation required by the slave controller, thus reducing wear and tear on the system and wasted energy. The flowchart of FIG. 4 is representative of machine readable instructions that are stored in memory and may include one or more programs which, when executed by a processor may cause vehicle 100 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include a host controller of a vehicle supplying a first voltage to a slave controller of a vehicle. The slave controller may have a nominal operating voltage. The host controller may supply a first voltage to the slave controller that is well above the nominal operating voltage, in order to account for any losses as well as a large safety factor (e.g., several volts).

At block 406, method 400 may begin a loop wherein it is determined whether data has been gathered for all corresponding slave controllers. Where there are a plurality of slave controllers supplied by a given host controller, data may be gathered for each slave controller.

In some examples, where there are a plurality of slave controllers 106 data may be gathered from only one slave controller. The "worst case" slave controller may be determined, and data may be gathered from only this slave controller (i.e., the slave controller receiving the lowest voltage from the host controller). This can either be established at the time of design in which case only the worst case controller requires the voltage measurement circuit 316.

At block 408, method 400 may include a first slave controller determining a received voltage. The received voltage may then be compared to a nominal operating voltage of the slave controller, and a difference may be determined at block 410. At block 412, the difference may be transmitted from the slave controller to the host controller.

The method may then proceed back to block 406, to determine whether all corresponding slave controllers have transmitted their respective voltage differences. If they have not all transmitted their respective difference, the method may proceed to block 408, wherein the next slave controller determines its received voltage, difference, and transmits the difference to the host. Blocks 408-412 may be performed for each slave controller.

When data has been gathered by the host controller for all corresponding slave controllers, method 400 may proceed to block 414. At block 414, method 400 may include determining the lowest difference. Where all slave controllers report a positive difference (i.e., where the received voltage is greater than the nominal operating voltage for every slave controller), the lowest difference may also be the smallest difference. But in an example where one or more slave controllers report a negative difference (i.e., the received voltage is lower than the nominal operating voltage) and one or more slave controllers report a positive difference (i.e., the received voltage is greater than the nominal operating voltage), the lowest difference may be the most negative value.

Block 416 may then include modifying the first voltage supplied to the slave controller(s) based on the lowest difference. For example, where all the received differences are positive, this may include reducing the first voltage by the lowest received difference. Alternatively, where one or more received differences are negative, the host controller may increase the supplied first voltage by the absolute value of the most negative amount. This may ensure that all the slave controllers receive a voltage that is at or above their respective nominal operating voltages. The modified voltage may then be supplied to the slave controllers at block 418. Method 400 may then end at block 420.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle power system comprising:
    a host controller configured to supply a slave controller with a first voltage, wherein the slave controller is a first slave controller of a plurality of slave controllers; and
    wherein each of the plurality of slave controllers are configured to:
        determine a respective received voltage;
        determine a respective difference between the respective received voltage and a respective nominal operating voltage; and
        transmit the respective difference to the host controller;
    wherein each respective received voltage is greater than the respective nominal operating voltage; and
    wherein the host controller is further configured to:
        receive a plurality of respective differences from the plurality of slave controllers;
        determine a lowest respective difference; and
        reduce the first voltage by the lowest respective difference.

2. The vehicle power system of claim 1, wherein the slave controller is positioned remotely from the host controller, and wherein the host controller is further configured to provide the slave controller with a switched power supply.

3. The vehicle power system of claim 1, wherein the first voltage is less than a maximum output voltage of the host controller.

4. The vehicle power system of claim 1, wherein the slave controller comprises analog circuitry configured to determine the respective received voltage.

5. The vehicle power system of claim 1, wherein the slave controller is further configured to transmit the respective difference to the host controller via a serial communication protocol.

6. A method comprising:
    supplying, by a host controller of a vehicle, a slave controller with a first voltage, wherein the slave controller is a first slave controller of a plurality of slave controllers;
    determining, for each of the plurality of slave controllers, a respective received voltage;
    determining a respective difference between the respective received voltage and a respective nominal operating voltage of the plurality of slave controllers, wherein each respective received voltage is greater than the respective nominal operating voltage;
    transmitting the respective difference to the host controller;
    receiving, by the host controller, a plurality of respective differences from the plurality of slave controllers;
    determining a lowest respective difference; and
    reducing the first voltage by the lowest respective difference.

7. The method of claim 6, wherein the slave controller is positioned remotely from the host controller, the method further comprising:
    providing the slave controller with a switched power supply.

8. The method of claim 6, wherein the first voltage is less than a maximum output voltage of the host controller.

9. The method of claim 6, wherein the slave controller comprises analog circuitry configured to determine the respective received voltage.

10. The method of claim 6, wherein transmitting the respective difference to the host controller comprises transmitting the respective difference via a serial communication protocol.

* * * * *